PREPARATION OF DEHYDROACETIC ACID
|  | △ | ○ |
|---|---|---|
| Reaction solvent: |  |  |
| Benzene, cc | — | 500 |
| Ethyl Acetate, cc | 450 | — |
| Acetic Anhydride, cc | 50 | — |
| Catalyst: Identity | Sodium Acetate | Sodium Hydroxide |
| Final concentration, wt.% | 0.08 | 0.11 |
| Reaction temperature, °C | 79-85 | 71-79 |
| Diketene feed rate, %/hr. | 61.0 | 50.0 |
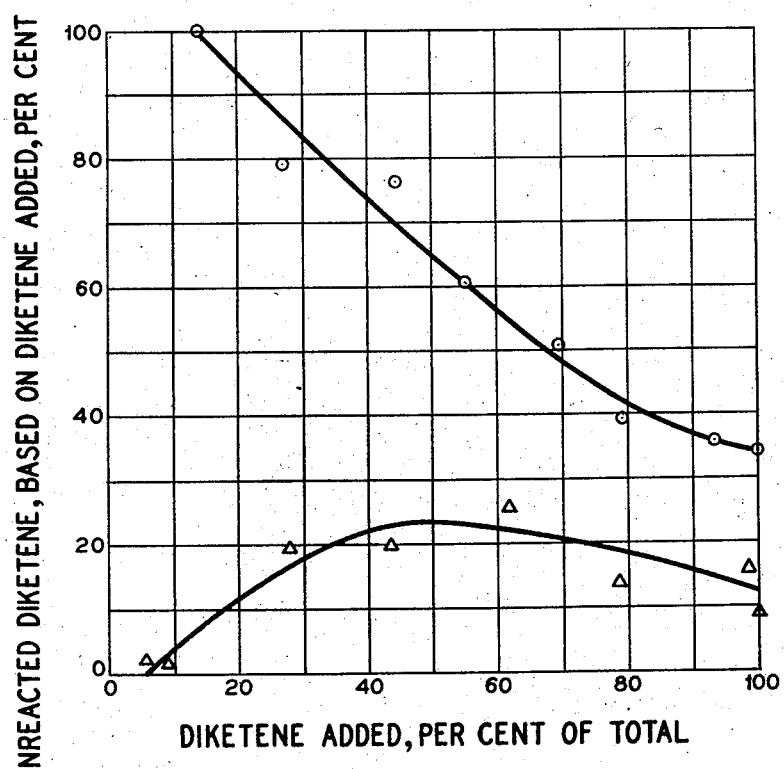
INVENTORS
AMELIO E. MONTAGNA
EVERETT R. LASHLEY, JR.
BY Louis C. Smith
ATTORNEY United States Patent Office
2,912,441
Patented Nov. 10, 1959

2,912,441
PRODUCTION OF DEHYDROACETIC ACID

Amelio E. Montagna and Everett R. Lashley, Jr., South Charleston, W. Va., assignors to Union Carbide Corporation, a corporation of New York Application July 30, 1954, Serial No. 446,751

17 Claims. (Cl. 260—343.5)

This invention relates to a new method for the preparation of dehydroacetic acid by the controlled dimerization of diketene.

Dehydroacetic acid may be prepared by the dimerization of diketene according to U.S. Patent No. 2,229,204, A. B. Boese, Jr. The method consists of adding diketene dropwise, to a refluxing solvent inert to diketene and containing a polymerization catalyst, the solvent apparently providing an inert reaction medium for the diketene.

Two disadvantages are inherent in the Boese method; an undesirably high concentration of unreacted diketene accumulates in the reaction mixture, and the dehydroacetic acid so prepared contains an undesirable, insoluble and high-melting by-product.

The first disadvantage inherent in the Boese method, that of the accumulation of an undesirably high concentration of unreacted diketene occurs because the reaction, when run according to the Boese method, exhibits an induction period. During this initial period, when the diketene is first being added to the reaction medium, the reaction proceeds slowly, or not at all. The problem is further complicated by the fact that if the diketene is added slowly the reaction exhibits a more prolonged induction period, and a higher concentration of unreacted diketene collects in the reaction medium before the reaction begins.

Since the heat of reaction for the dimerization of diketene to form dehydroacetic acid is 30 kilocalories per mole, it follows that reacting a small amount of diketene releases considerable heat. This increase in heat causes the reaction, once started, to proceed with greater velocity and to add heat to the reaction medium at an increased rate, resulting in an even greater speed of reaction and release of heat. With a sufficiently high concentration of unreacted diketene the reaction, once started, is impossible to control, and rapidly vaporizes the reaction medium.

Although on a laboratory scale precautions may be taken to limit the permanent damage from such a runaway reaction to loss of the reactant and solvent, on a commercial scale the loss of reactant and solvent alone entails a serious cost, aside from the attendant dangers.

The common expedients useful in eliminating such induction periods, such as reserving a portion of the reaction mixture from a previous run as a "seed" for a new run, are of no avail.

We have discovered that if the dimerization is carried out in certain reaction media the induction period is eliminated entirely, the reaction proceeding smoothly from the first addition of diketene; the concentration of unreacted diketene never attains dangerous levels, and the reaction is easily controlled.

These inert solvent media, in which the reaction exhibits no induction period are: ester solvents such as ethyl acetoacetate, methyl, ethyl, butyl, and 2-ethylhexyl acetate, ethyl and isopropyl benzoate; ketone solvents such as acetone and methyl ethyl ketone; carboxylic acid anhydrides such as acetic anhydride; mixtures of ester solvents and carboxylic acid anhydrides, and mixtures of ketone solvents and carboxylic acid anhydrides; and dioxane containing a carboxylic acid anhydride.

Dioxane in itself does not possess the property of providing a reaction medium exhibiting no induction period; however, when a carboxylic acid anhydride is added to dioxane the combination of solvents does provide a reaction medium in which the reaction has no induction period. We prefer a solution of dioxane containing at least 1 percent by volume of the medium of a carboxylic acid anhydride; we especially prefer a medium of dioxane containing at least 10 percent, by volume of the medium, of acetic anhydride.

The specific effect of the solvent media is shown in the drawing, Figure 1, where a comparison of the amounts of unreacted diketene in the reaction media of Boese's method and of our method are compared. In this comparison, in our process the diketene was added at a rate of 61 percent of the total per hour; in Boese's method the diketene was added at a rate of 50 percent of the total per hour. In spite of the more rapid rate of addition, under the conditions of our method, the concentration of unreacted diketene expressed as percent of the diketene added, is seen to always be less than that found under the conditions of Boese's method. At the point where 14 percent of the diketene had been added the concentration of unreacted diketene under Boese's conditions was more than 10 times greater than under our conditions; when 50 percent of the diketene had been added the concentration of diketene was about 3 times as great; when 100 percent of the diketene had been added the concentration of unreacted diketene was 2.6 times as great as that found under the conditions of our method. It is this persistently high concentration of unreacted diketene which makes the Boese method hazardous to use on a commercial scale.

The second disadvantage in the Boese method, that of the formation of an undesirable, insoluble and high-melting by-product is shown by work subsequent to that disclosed in U.S. 2,229,204. Thus Steele, Boese, and Dull show that an impure product is obtained by the Boese method—A Study of the Polymerization Products of Diketene, Journal of Organic Chemistry, vol. 14, page 460 (1949). In this paper the authors note, "Diketene of 99.5% purity was polymerized in boiling benzene solution in the presence of sodium phenoxide, according to the procedure of Boese (5). Carbon dioxide was evolved. Processing of the reaction products led to the isolation of (I) in 54% yield, 2,6-dimethylpyrone (II) in 4% yield, and a white solid (III), $C_{19}H_{16}O_6$ in 8% yield.

"The same products were obtained in polymerization of diketene in benzene, toluene and xylene solution in the presence of either sodium phenoxide, sodium acetate, tributyl-, or triethylamine."

In this reference (I) is dehydroacetic acid and (5) is given as "(5) Boese, U.S. Patent 2,229,204 (1941)."

Of these products, 2,6-dimethyl-pyrone is soluble in the common solvents and is easily removed by washing the dehydroacetic acid; on the other hand, the white solid of empirical formula $C_{19}H_{16}O_6$, and tentatively identified by Boese and associates as 2,6-bis-(6-methyl-4-oxo-2-pyranylmethyl) pyrone, is virtually insoluble in all common solvents save boiling 1,4-dioxane and boiling glacial acetic acid. If it were not for the presence of this insoluble by-product, the dehydroacetic acid produced by the Boese method could be purified by washing with such common solvents as methanol, benzene, and ethyl acetate.

We have been able to completely repress the formation of this insoluble and high-melting by-product by the discovery that if the reaction is carried out in an acetic anhydride reaction medium none of the insoluble by-product is formed; and by the further discovery that relatively small amounts of a carboxylic acid anhydride (10 percent by volume of the reaction medium), when added to ester solvent media, and to a dioxane solvent medium, also completely repress the formation of the insoluble by-product.

Thus, by a combination of these two discoveries, we have been able to eliminate both of the objectionable features inherent in the Boese method for dimerizing diketene to form dehydroacetic acid. When ester solvents containing at least 10 percent by volume of the solution of a carboxylic acid anhydride and dioxane containing at least 10 percent by volume of the solution of a carboxylic acid anhydride, are used as reaction media for the dimerization, no induction period for the dimerization exists; none of the objectionable by-product is formed; and filtering, and washing the product with such common solvents as methanol, benzene, and ethyl acetate suffice to give dehydroacetic acid of a purity as high as 99 percent.

The anhydrides suitable for the repression of the insoluble by-product are the anhydrides of aliphatic and aromatic mono- and dicarboxylic acids such as acetic anhydride, propionic anhydride, n-butyric anhydride, n-valeric anhydride, succinic anhydride, and benzoic anhydride. Acetic anhydride is preferred.

By way of comparison of yield and purity of the product obtained by use of the Boese method and by use of our method, Table I is furnished.

TABLE I

*Comparison with Boese method*

| | Method | |
|---|---|---|
| | This Invention | Boese |
| Diketene Feed, ml.a | 500 | 200 |
| Solvent mixture: | | |
| Benzene, ml | | 250 |
| Ethyl acetate, ml | 450 | |
| Acetic anhydride, ml | 50 | |
| Total, ml | 500 | 250 |
| Catalyst: | | |
| Sodium acetate, gm | 0.5 | 0.5 |
| Concentration at start, wt. percent | 0.11 | 0.23 |
| Concentration at end, wt. percent | 0.05 | 0.11 |
| Reaction temperature, °C | 80–88 | 80–86 |
| Digestion period, hr | 1.0 | 1.0 |
| Wash solvent: | | |
| Identity | Ethyl Acetate | Methanol |
| Volume, ml | 450 | 200 |
| Washed Dehydroacetic Acid, gm | 267 | 97 |
| Yields based on contained diketene: | | |
| Washed crystals, wt. percent | 51.7 | 44.5 |
| Contained dehydroacetic acid, wt. percent b | 50.0 | 39.9 |
| Insoluble by-product, wt. percent | 0.0 | 2.6 |
| Analysis of washed dehydroacetic acid: | | |
| Purity— | | |
| NaOCH₃ method, wt. percent c | 99.2 | |
| NaOH method, wt. percent d | 96.7 | 89.5 |
| Melting point, °C | 105–109 | 105–107 |
| Insoluble by-product, wt. percent | 0.0 | 5.82 | a Refined diketene, weight=108.9 gm./100 ml. at 20° C. purity=95 percent by weight.
b Based on purity as determined by the NaOH method, (d) below.
c NaOMe method: A weighed sample of dehydroacetic acid in pyridine is titrated with 0.1 N sodium methylate to a thymolphthalein endpoint.
d NaOH method: A weighed sample of dehydroacetic acid in methanol is titrated with 0.5 N sodium hydroxide to a phenolphthalein endpoint.

In our method for the dimerization of diketene to form dehydroacetic acid we employ inert reaction media consisting essentially of an ester solvent, inert reaction media consisting essentially of a carboxylic acid anhydride, inert reaction media consisting essentially of a mixture of an ester solvent and a carboxylic acid anhydride, and inert reaction media consisting essentially of dioxane and a carboxylic acid anhydride. In all of these media the reaction exhibits no induction period. When the amount of carboxylic acid anhydride in the reaction medium is 10 percent by volume or greater, the media possess the further property of completely repressing the formation of the insoluble and high-melting by-product formed when Boese's method is employed.

Ketones also provide media in which the reaction exhibits no induction period; these, however, favor the production of the insoluble by-product. When the dimerization is carried out in a medium consisting of benzene and 10 percent by volume of the medium of acetic anhydride, none of the high-melting by-product is formed; however, the reaction exhibits an induction period. Benzene is not one of the solvent media of this invention.

A large number of catalysts are suitable for the dimerization reaction; in general, these are the carboxylic acid salts, enolates, carbonates, phenolates, alcoholates, oxides and hydroxides of sodium and potassium, preferably sodium. Sodium acetate is the preferred catalyst.

We prefer to run the reaction at the reflux temperature of the reaction mixture. In general, this is a temperature of 50° C. to 110° C.

In our preferred procedure, dehydroacetic acid is prepared by adding diketene to an equal volume of a refluxing mixture of 90 percent by volume of the mixture of ethyl acetate, 10 percent by volume of the mixture of acetic anhydride, and 0.2 percent by weight of the final mixture of sodium acetate. The diketene is added at a rate approximately equal to 25 percent of the total volume of diketene per hour. After the addition of the diketene, the mixture is digested at reflux temperature for an hour or more. Following the digestion period, the mixture is chilled to 0° C. and the crude dehydroacetic acid is filtered off; the crude product is then washed with ethyl acetate, methanol or other suitable solvent and dried. In an equally preferred procedure, dehydroacetic acid is prepared by adding diketene to a refluxing mixture of 90 percent by volume of the mixture of dioxane and 10 percent by volume of acetic anhydride, the other conditions and procedures remaining the same.

The following examples are illustrative of this invention.

EXAMPLE I

The reaction vessel for the preparation of dehydroacetic acid was a 2-liter creased-glass kettle, and a graduated 250 ml. separatory funnel served as a feed tank for the diketene. The reaction mixture was agitated by a motor-driven propeller-type stirrer. A reflux condenser vented the reactor to the atmosphere. A mixture of 50 ml. (10 percent by volume) of acetic anhydride, 450 ml. of ethyl acetate and 0.5 gm. of sodium acetate was added to the kettle. A thermometer fitted into the kettle determined the internal reaction temperature. The stirrer was turned on and the mixture heated to reflux. After this the diketene feed was started and 500 ml. of diketene was added, dropwise, over a four hour period. After the addition of diketene was completed the agitation was continued at reflux temperature for one hour more. The dark red reaction mixture was then cooled to 0° C. and the resulting slurry was filtered, the crystals being pressed as dry as possible to remove entrained liquid. The crystals of dehydroacetic acid were then slurried with 450 ml. of ethyl acetate which had previously been cooled to 0° C. The product dehydroacetic acid was recovered by filtering and air-dried.ABderoacetic acid of 96.7 percent purity in a yield of 51.7 percent, based on the diketene, was obtained. This product was completely soluble in methanol indicating that none of the objectionable by-product was obtained; this reaction showed no induction period.

EXAMPLE II

To the reactor was charged 250 ml. (100 percent by volume) of acetic anhydride and 0.25 gm. of sodium methylate. The mixture was heated to 70–85° C. and 250 ml. of diketene was added dropwise over a period of 1.75 hours; the reaction showed no induction period. The reaction mixture was digested for 2 hours of 70–85° C. and then cooled to 0° C. and filtered. The dehydroacetic acid was washed with 200 ml. of cold methanol and filtered. The dry dehydroacetic acid was obtained in a yield of 59.3 percent and in 93.5 percent purity. No insoluble by-product was found.

EXAMPLE III

The reactor was charged with 125 ml. (50 percent by volume) of acetic anhydride, 125 ml. of ethylacetate and 0.1 percent by weight of sodium methylate. The mixture was heated to reflux and 250 ml. of diketene was added over a period of 1.5 hours. After the diketene was added the mixture was digested for 1 hour. Dehydroacetic acid in 58.1 percent yield and 98.0 percent purity was obtained. No insoluble by-product was formed; no induction period was observed.

EXAMPLE IV

To the reactor was charged 2.5 ml. (1 percent by volume) of acetic anhydride, 247.5 ml. of ethyl acetate, and 0.25 gm. of sodium methylate. To the refluxing mixture was added 250 ml. of diketene over a period of 1.42 hours. The mixture was digested at reflux for 1 hour and then cooled to 0° C. The slurry was filtered and the resulting crystals were washed with 200 ml. of cold methanol. The dry dehydroacetic acid was produced in 55.1 percent yield. The product had a purity of 94.4 percent and contained 0.8 percent of the insoluble by-product; no induction period was observed.

EXAMPLE V

To 250 ml. of refluxing ethyl acetate containing no acetic anhydride and 0.5 gm. of sodium methylate, 250 ml. of diketene was added dropwise over a period of 1.92 hours; no induction period was observed. Refluxing was continued for 1 hour. The mixture was then cooled to 0° C. and filtered. The crystals were washed with 100 ml. of cold methanol and dried. The yield was 43.8 percent and the dehydroacetic acid had a purity of 93.1 percent. This dehydroacetic acid contained 4.6 percent of the by-product.

EXAMPLE VI

The reactor was charged with 25 ml. (10 percent by volume) of acetic anhydride, 225 ml. of dioxane and 0.10 percent by weight of sodium methylate. To the refluxing mixture was added 250 ml. of diketene over a period of 1.5 hours and the mixture was then digested at reflux for 1 hour; the reaction exhibited no induction period. Dehydroacetic acid in 46.9 percent yield and 99.0 percent purity was obtained. No insoluble by-product was formed.

EXAMPLE VII

The reactor was charged with 25 ml. (10 percent by volume) of acetic anhydride, 225 ml. of benzene, 0.11 percent by weight of sodium methylate, and heated to reflux. Over a period of 1.08 hours 250 ml. of diketene was added to the refluxing mixture. This reaction exhibited an induction period. Dehydroacetic acid in 65.9 percent yield and 97.6 percent purity was obtained with no insoluble by-product.

EXAMPLE VIII

The reactor was charged with 25 ml. (10 percent by volume) of acetic anhydride, 225 ml. of methyl acetate, 0.12 percent by weight of sodium methylate, and heated to reflux. Over a period of 2.42 hours 250 ml. of diketene was added to the refluxing mixture. Dehydroacetic acid was obtained in 59.9 percent yield and 95.4 percent purity and containing 0.51 percent of insoluble by-product. The reaction exhibited no induction period.

EXAMPLE IX

To the reaction vessel was charged 25 ml. (10 percent by volume) of acetic anhydride, 225 ml. of acetone and 0.12 weight percent of sodium methylate, the mixture was heated to reflux and 250 ml. of diketene was added over a period of 2 hours. The mixture was then digested for 1 hour. The yield of dehydroacetic acid was 38.8 percent; the purity of the dehydroacetic acid was 80.3 percent and its content of insoluble by-product was 13.7 percent. The reaction showed no induction period.

EXAMPLE X

An experiment similar to Example VIII using methyl ethyl ketone as the solvent, and in which the diketene was added over a period of 3.08 hours gave a yield of 25.6 percent of dehydroacetic acid which contained 13.4 percent of by-product. The reaction showed no induction period.

The following Table II shows the results obtained in following the procedure used in the previous examples employing various ester solvents and sodium methylate catalyst. None of these runs exhibited an induction period. No carboxylic acid anhydride was present in any of these reaction media.

TABLE II

| Solvent | Ethyl acetoacetate | Butyl acetate | 2-Ethylhexyl acetate | Methyl acetate | Ethyl benzoate | Isopropyl benzoate |
|---|---|---|---|---|---|---|
| Catalyst (conc. in wt. percent): | | | | | | |
| At start | 0.16 | 0.23 | 0.23 | 0.21 | 0.19 | 0.19 |
| At end | 0.07 | 0.10 | 0.10 | 0.10 | 0.09 | 0.09 |
| Reaction temp. (° C.) | 50 | 71–76 | 70–77 | 56–59 | 75–80 | 71–80 |
| Feeding time of diketene (hours) | 2.67 | 3.58 | 2.58 | 3.53 | 3.08 | 3.08 |
| Yield of dehydroacetic acid (wt. percent) | 41.5 | 47.7 | 55.8 | 50.8 | 38.0 | 42.2 |
| Purity of dehydroacetic acid (percent) | 90.4 | 89.4 | 85.5 | 90.9 | 85.7 | 84.1 |
| Insoluble by-product contained in dehydroacetic acid (wt. percent) | 2.4 | 5.6 | 8.4 | 4.9 | 5.5 | 5.7 |

The following Table III above the use of various catalysts with ethyl acetate as the solvent. The same general procedure as previously described was employed using in each case 250 ml. of solvent and of diketene. None of these runs exhibited an induction period.

TABLE III
Catalysts

| Catalyst: Identity | Sodium Hydroxide [a] | Potassium Hydroxide | Sodium alcoholate of "Butyl Carbitol" [b] | Sodium carbonate | Sodium bicarbonate |
|---|---|---|---|---|---|
| Conc. at start (wt. percent) | 0.23 | 0.22 | [c] 0.07 | 0.22 | 0.22 |
| Conc. at finish (wt. percent) | 0.10 | 0.10 | [c] 0.03 | 0.10 | 0.10 |
| Reaction temp. (° C.) | 72–78 | 72–79 | 74–78 | 75–80 | 75.83 |
| Feeding time of diketene (hrs.) | 2.58 | 3.75 | 3.50 | 3.42 | 3.88 |
| Yield of dehydroacetic acid (wt. percent) | 48.8 | 43.4 | 36.4 | 48.1 | 50.7 |
| Purity of dehydroacetic acid (percent) | 89.2 | 85.3 | 91.0 | 90.7 | 90.4 |
| Insoluble byproduct contained in dehydroacetic acid (wt. percent) | 3.5 | 10.5 | 6.2 | 5.1 | 4.3 |

[a] 10 ml. of ethyl acetoacetate added to increase initial solubility of catalyst.
[b] "Butyl Carbitol" is $C_4H_9$—O—$C_2H_4$—O—$C_2H_4OH$.
[c] Concentration calculated as sodium hydroxide equivalent.

What is claimed is:

1. In the method for the production of dehydroacetic acid by the dimerization of diketene in an inert solvent medium in the presence of a catalyst for the dimerization, the improvement, whereby the induction period of the reaction is eliminated, which comprises carrying out the reaction in a solvent medium consisting essentially of an ester of an alkyl alcohol and a monocarboxylic acid selected from the group consisting of the lower alkyl acids, and aryl acids.

2. In the method for the production of dehydroacetic acid by the dimerization of diketene in an inert solvent medium in the presence of a catalyst for the dimerization, the improvement, whereby the induction period of the reaction is eliminated, which comprises carrying out the reaction in a solvent medium consisting essentially of an ester of an alkyl alcohol and a monocarboxylic acid selected from the group consisting of the lower alkyl acids, and aryl acids and an anhydride of a lower alkyl monocarboxylic acid.

3. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of a mixture of an ester of an alkyl alcohol and a monocarboxylic acid selected from the group consisting of lower alkyl acids, and aryl acids and at least 10 percent by volume of the reaction medium of an anhydride of a lower alkyl monocarboxylic acid.

4. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of a mixture of an ester of an alkyl alcohol containing up to about 8 carbon atoms and a monocarboxylic acid selected from the group consisting of the lower alkyl acids, and aryl acids and at least 10 percent by volume of the reaction medium of acetic anhydride.

5. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of methyl acetate and at least 10 percent by volume of the reaction medium of an anhydride of a lower alkyl monocarboxylic acid.

6. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of ethyl acetate and at least 10 percent by volume of the reaction medium of an anhydride of a lower alkyl monocarboxylic acid.

7. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of butyl acetate and at least 10 percent by volume of the reaction medium of an anhydride of a lower alkyl monocarboxylic acid.

8. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of ethyl acetoacetate and at least 10 percent by volume of the reaction medium of an anhydride of a lower alkyl monocarboxylic acid.

9. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of ethyl benzoate and at least 10 percent by volume of the reaction medium of an anhydride of a lower alkyl monocarboxylic acid.

10. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of methyl acetate and at least 10 percent by volume of the reaction medium of acetic anhydride.

11. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of ethyl acetate and at least 10 percent by volume of the reaction medium of acetic anhydride.

12. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of butyl acetate and at least 10 percent by volume of the reaction medium of acetic anhydride.

13. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of ethyl acetoacetate and at least 10 percent by volume of the reaction medium of acetic anhydride.

14. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of ethyl benzoate and at least 10 percent by volume of the reaction medium of acetic anhydride.

15. In the method for the production of dehydroacetic acid by the dimerization of diketene in an inert solvent medium in the presence of a catalyst for the dimerization, the improvement, whereby the induction period of the reaction is eliminated, which comprises carrying out the reaction in a solvent medium consisting essentially of dioxane and an anhydride of a lower alkyl monocarboxylic acid.

16. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of dioxane and at least 10 percent by volume of the medium of an anhydride of a lower alkyl monocarboxylic acid.

17. In the method for the production of dehydroacetic acid by the dimerization of diketene in an inert solvent medium in the presence of a catalyst for the dimerization, the improvement, whereby the induction period of the reaction is eliminated and readily purified dehydroacetic acid is obtained, which comprises carrying out the reaction in a solvent medium consisting essentially of dioxane and at least 10 percent by volume of the medium of acetic anhydride.

References Cited in the file of this patent

UNITED STATES PATENTS

| | | |
|---|---|---|
| 2,105,461 | Boese | Jan. 18, 1938 |
| 2,229,204 | Boese | Jan. 21, 1941 |
| 2,729,652 | Nordt | Jan. 3, 1956 |

FOREIGN PATENTS

| | | |
|---|---|---|
| 384,872 | Canada | Oct. 31, 1939 |

OTHER REFERENCES

Boese: Ind. Eng. Chem., vol. 32, pp. 16–22 (1940).